Feb. 6, 1962  H. REID  3,019,684
FLAT EDGE TRIMMER WITH AN INTERNAL SHEARING PUNCH
AND AUTOMATIC OPERATING MEANS THEREFOR
Filed Sept. 8, 1958  14 Sheets-Sheet 6

Fig: 6.

Inventor:
Henry Reid.

By Harry B. Cook,
Attorney

Inventor:
Henry Reid.

Inventor:
Henry Reid.

INVENTOR.
Henry Reid.

Inventor:
Henry Reid.

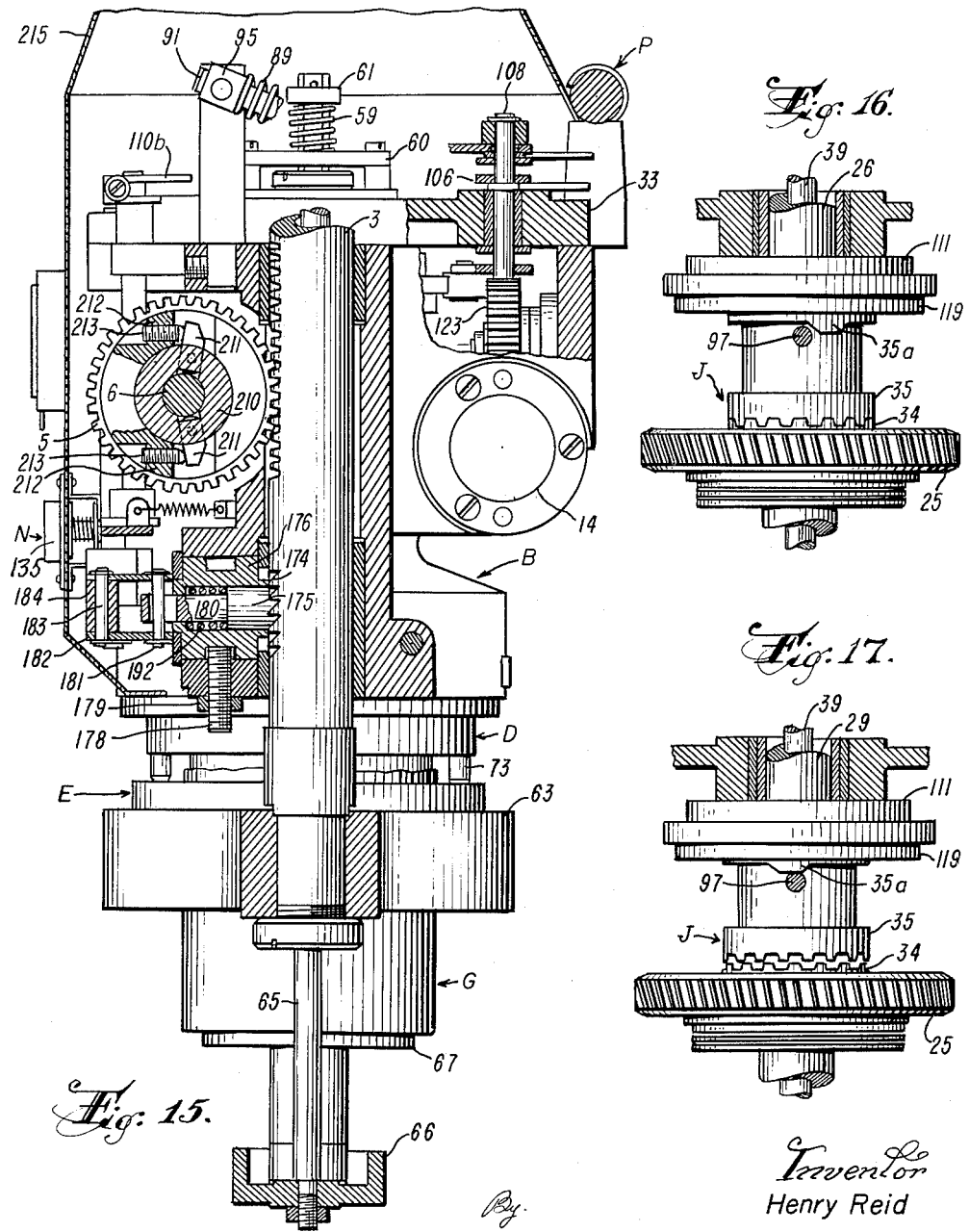

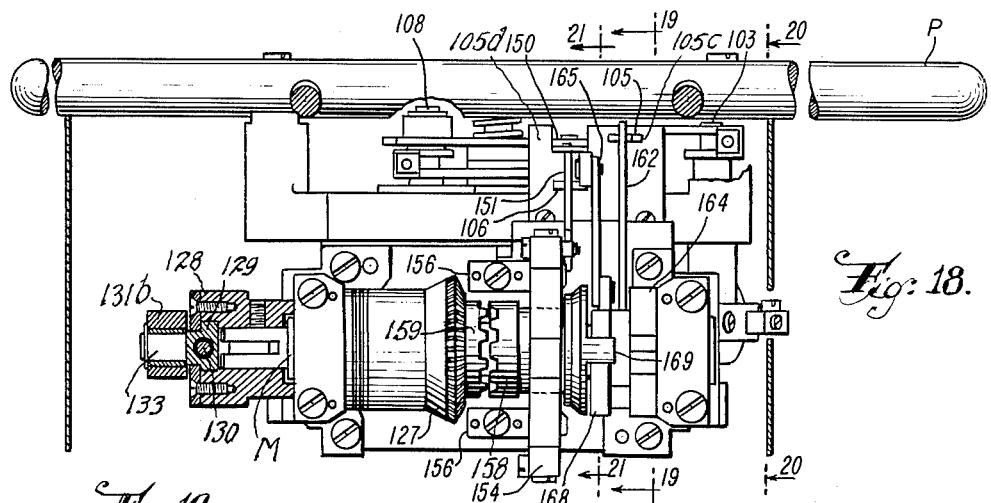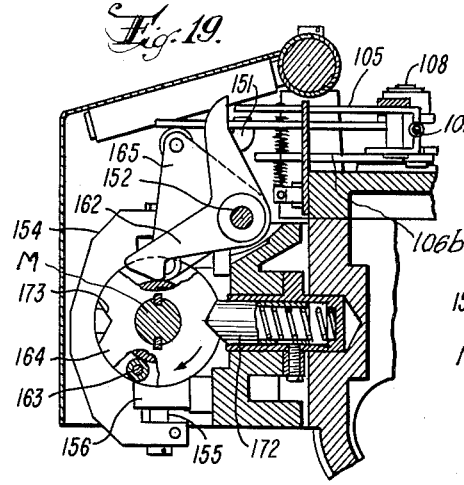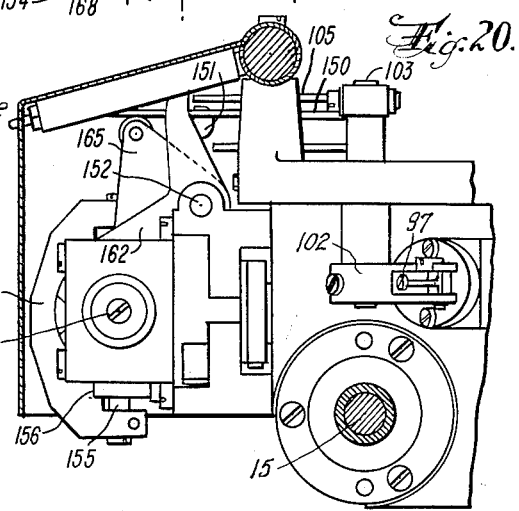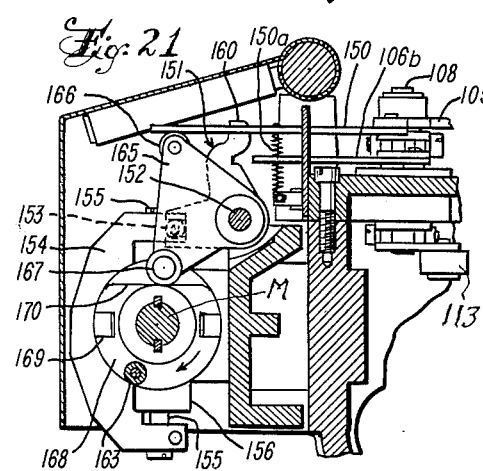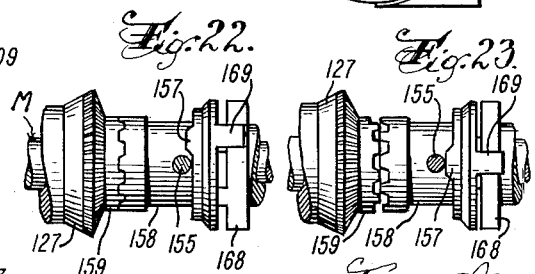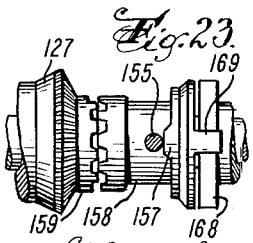
Inventor:
Henry Reid.

United States Patent Office 3,019,684
Patented Feb. 6, 1962

3,019,684
FLAT EDGE TRIMMER WITH AN INTERNAL SHEARING PUNCH AND AUTOMATIC OPERATING MEANS THEREFOR
Henry Reid, 24 Birchwood Ave., West Orange, N.J.
Filed Sept. 8, 1958, Ser. No. 759,653
14 Claims. (Cl. 83—190)

This invention relates in general to a machine for performing cutting operations upon sheet metal articles, and more particularly the invention is directed to a machine for trimming the edges and punching or notching the walls of thin-walled articles, such as cans, cups, boxes and covers, especially such articles having irregular edges formed by pressing or drawing sheet metal blanks or by extrusion.

Known machines of this general character are cumbersome, unwieldy and expensive structures that require large space, excessive maintenance and servicing, as well as exceptional skill in their operation and set-up. Regardless of the type of work piece, the size of known machines is out of proportion to the work accomplished; for example, a small work piece will be trimmed on a machine of the same size required by another substantially larger work piece.

Because of the cumbersome structure of known machines, the power required to operate the supplementary features is far in excess of that necessary for the trimming operation. In my Patent No. 2,759,541 dated August 21, 1956, is described a machine embodying structures and principles which minimize supplementary power requirements so that only the force used to trim the work is needed to operate a machine.

The vast majority of work pieces are of relatively small size, and the machine of the invention provides a novel and improved construction which can be embodied in a series of machines graduated in size in proportion to the work pieces to be operated upon.

The invention also contemplates such a machine which shall be easy to operate, inexpensive in construction and operation, light in weight; which shall economically fabricate the work pieces; which shall be capable of trimming relatively large work pieces as compared to the size of the machine; and which is readily adaptable to any convenient work position and so constructed that it may be conveniently stored when not in use.

Machines of this type generally include a main frame having a punch and die on two relatively movable parts, respectively, at least one of which is mounted on the main frame, and the insertion and removal of the work piece into and out of position between the punch and die and the changing of the punch and die is difficult and often dangerous. The machine of the invention overcomes this difficulty by providing a main or supporting frame and a work head carrying both the punch and die and tiltably mounted on the supporting frame to permit convenient and rapid insertion and removal of the punch and die and the work piece and to provide for gravity discharge of the work piece after it has been trimmed.

The machine described in my said patent includes a punch on the machine frame and a combined die support and work clamp mounted on said frame to move vertically toward and away from the punch to hold and release a workpiece and said die in and out of work-operating relation to said punch, respectively. One object of the present invention is to provide in such a machine novel and improved automatic power-actuated means for moving the die support and work clamp into and out of said work-operating position.

Another object is to provide a novel spring means permitting the balancing of the forces necessary to raise the die support into work-operating or trimming position and then return same to loading position.

Still another object of the present invention is to provide in a machine of this character, novel and improved locking means to positively confine the workpiece during the trimming operation so that an external power sourse is not required to resist separation of the punch and die shearing faces when the resultant forces from the shearing action come into play.

A further object is to provide automatic operation after the insertion of the workpiece in the machine, said automatic operation incorporating safety features to avoid a repeat cycling of the machine and thereby eliminate the possibility of injury to the operator.

Another object is to provide in the die holder elevating mechanism a variable gear drive of a similar nature to that shown in my copending application Ser. No. 486,839 filed February 8, 1955, to permit a dwell time which will eliminate any load on the clutch controlling the elevating mechanism during its engaging or releasing periods.

In the combined die holder or support and work clamp, the work clamp is movable toward and away from the die holder to permit the insertion and removal of the work, and still another object of the invention is to provide novel and improved means for limiting movement of the work clamp away from the die holder.

Other objects, advantages and results of the invention will be brought out by the following description in conjunction with the accompanying drawings in which—

FIGURE 1 is an elevational view of the right hand side of a machine embodying the invention, as viewed from the front, with portions of the casing broken away and with the parts of the machine in work-loading position, and illustrating in dot and dash outline the work head in a partially open and tilted position to provide ready access for changing of the punch and die or to permit the work piece to fall from the machine;

FIGURE 15 is a vertical sectional view taken on the plane of the line 15—15 of FIGURE 6;

FIGURE 16 is a composite fragmentary vertical sectional and elevational view of the clutch members of the vertical countershaft that drives the cam for the punch and illustrating the clutch in closed or engaged position;

FIGURE 17 is a similar view showing the clutch in open or disengaged position;

FIGURE 18 is a fragmentary rear elevational view of the main drive shaft taken approximately on the plane of the line 18—18 of FIGURES 6 and 14;

FIGURE 19 is a transverse sectional view of the main drive shaft from approximately the plane of the line 19—19 of FIGURE 18;

FIGURE 20 is a fragmentary end elevational view taken approximately on the plane of the line 20—20 of FIGURE 18 and showing the supporting bracket for the main drive shaft and a portion of the release mechanism for the vertical countershaft;

FIGURE 21 is a transverse sectional view approximately on the plane of the line 21—21 of FIGURE 18 showing the non-repeat cam lever for the main driving shaft clutch control mechanism;

FIGURE 22 is a fragmentary elevational view of the clutch members controlling the starting and stopping of the main drive shaft and raising and lowering the die holder and illustrating the clutch in closed or engaged condition; and FIGURE 23 is a similar view showing the clutch in an open or released condition.

Figure 1:
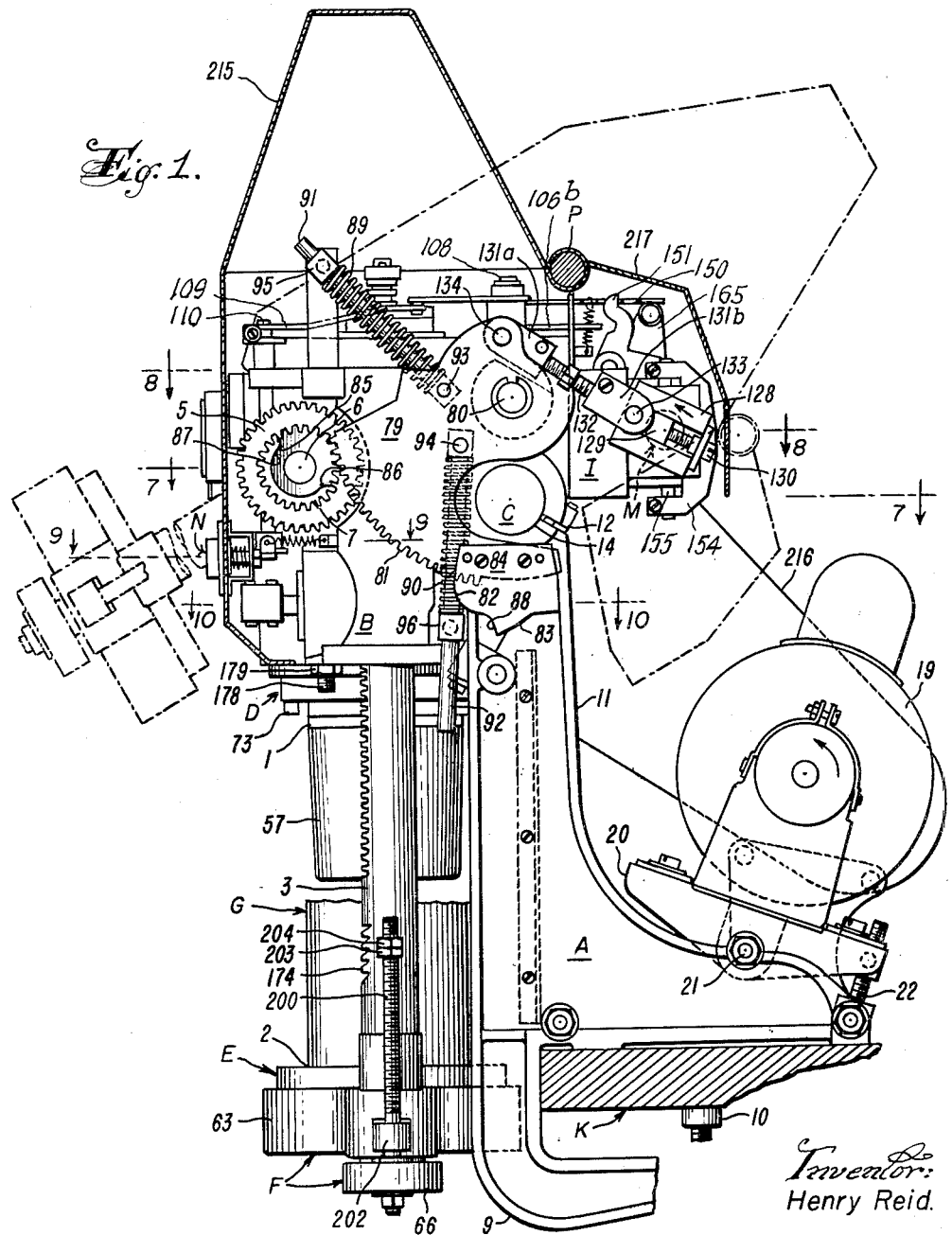

Generally describing the illustrated embodiment of the invention, the machine includes a main frame A and a secondary frame B which may be a part of the main frame but is preferably pivotally connected to the main frame to swing about a horizontal axis C. At the lower end of the secondary frame B is a punch generally designated D with which cooperates a die E that is mounted on a combined die support and work-piece clamp which is generally designated F and is movable away from the punch to permit the insertion and removal of work pieces G and is movable toward the punch to clamp the work pieces in a position to be operated upon by the punch and die. The punch is movable in its own plane which during operation of the machine is preferably horizontal, and the punch has a cutting edge 1 to cooperate with a cutting edge 2 on the die when the punch is so moved. The punch is actuated by driving means generally designated H above the punch (FIG. 13), and the combined die support and work clamp is mounted for movement into and out of work-operating position by mechanism including rack bars 3 that are vertically slidably mounted in bearings 4 in the secondary frame and mesh with the respective gears 5 which are fast connected to a horizontal shaft 6 which is journaled in the secondary frame. The shaft 6 has a pinion 7 fast connected thereto and adapted to be drivingly connected to a power operated mechanism generally designated I for moving the die support and work clamp into work operating position and for locking them in said position.

The driving means for the die also includes a clutch J (FIGS. 13 and 14) for connecting and disconnecting the punch to and from a prime mover, in combination with mechanism for automatically starting the punch when the work is clamped in work-operating position and for automatically stopping the punch after a predetermined cycle of operation.

More specifically describing the invention, the main frame A is shown as comprising a base portion 9 (FIGS. 3 and 4) which may be in the form of two C-clamps and has clamping screws 10 for fastening the frame on the edge portion of a bench or the like K. Upstanding from the base portion are two horizontally spaced standards 11 each of which has a split bearing 12 for the respective trunnions 13 and 14 that are connected to the secondary frame B (FIG. 7) to tiltably mount the secondary frame on the main frame. The trunnions have coaxial openings in which is journaled a driving shaft 15 to which is connected a pulley 16 that is driven by a belt 17 (FIGS. 3 and 7) from a variable pitch pulley 18 on the shaft of an electric motor 19 which is secured to an adjustable motor support 20 that is pivotally mounted at 21 on the base portion of the main frame and can be adjusted by a screw 22 to vary the tension of the belt 17 in known manner.

Mounted on and driven by the shaft 15 is a worm 24 which meshes with a worm gear 25 that is rotatable relatively to a tubular vertical countershaft 26 that is journaled in a roller bearing 27 in an opening 29 in a partition 30 that separates upper and lower recesses 31 and 32 of the secondary frame which open through the respective ends of the frame. The upper recess 31 is normally closed by a combined cover and bearing 33 in which the shaft 26 is also journaled. Cooperating with the gear 25 is the clutch mechanism J that includes a clutch element 34 connected to the gear and another clutch element 35 that is keyed to the shaft 26 for movement longitudinally of the shaft and is normally influenced into engagement with the clutch element 34 by springs 36. Means hereafter to be described is provided for causing engagement of said clutch elements simultaneously with the clamping of the work piece in work-operating position and for disengaging the clutch elements after a predetermined period of time or cycle.

It will thus be seen that while the motor 19 is running, the gear 25 will be continuously driven and that when the clutch elements 34, 35 are engaged, the shaft 26 will be rotated. At the lower end of the shaft 26 a cam 37 is fast secured to the shaft between a shoulder 38 on the shaft and a nut 39 screwed onto the end of the shaft. The cam 37 cooperates with an annular follower 40 the upper end of which has a flange 41 that is disposed between a bearing 42 and a guide mechanism that includes a ring 53 (see also FIG. 10), pairs of blocks 55 and 56, and an end plate 43 on the secondary frame. A punch-carrying plate 47 is secured to the follower 40 by screws 48 and the punch D is fastened to the plate 47 by screws 49. The punch is shown of circular shape but it may be of any desired form to suit the contour of the work piece. In the present instance the work piece G is cup-shaped, having a base portion $a$ and an annular wall $b$ and the die is a circular annulus. When it is desired to punch or notch the annular wall, a suitably shaped punch or lug, respectively, may be fixed on the punch D to cooperate with a corresponding hole or groove in the die E. While the form of the cam and the follower may be varied, preferably they are of the same nature as the cam and follower shown in my Patents Nos. 2,759,366 dated August 21, 1956, and 2,759,541 dated August 21, 1956. The punch is moved in successive cycles, each cycle comprising a plurality of steps in succession in the same direction around the axis and each step consisting of a movement of the punch along a straight line radial to the die and to and from a central position concentric with the die.

Any suitable means may be utilized for mounting and actuating the follower to actuate the punch in the manner described. The cam follower 40 is shown (FIGURE 10) as having a square opening with rounded corners 40a and the cam 37 has one primary lobe 37a and two complementary lobes 37b and 37c contoured to coact with the side walls of the square opening upon rotation of the cam and move the follower along a straight line from and to a central position concentric with the axis of rotation of the cam each time the primary lobe is moved successively into and out of conatct with any side wall of the follower opening, respectively, and the periphery of the cam also has a curved surface 37d and two concentric surfaces 37e contoured for engagement with each side wall of the follower opening during said movement of the primary lobe to prevent all other movement of said follower in directions radial to said axis. The above-mentioned grooved guide ring 53 (FIGURES 10, 13 and 14) and said pairs of blocks 55 and 56, all of known construction, guide the follower and punch in straight lines perpendicular to the respective side walls of the follower opening.

Figure 10:
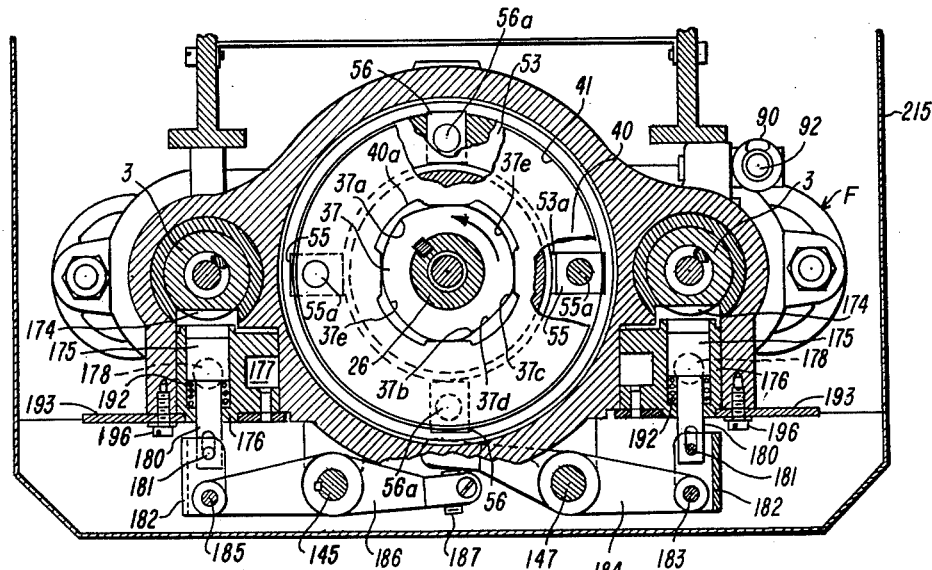
FIGURE 10 is a horizontal sectional view of the work head or secondary frame approximately on the plane of the line 10—10 of FIGURE 1 showing the cam and follower for operating the trimming punch and a portion of the rack bar locking mechanism for the combined die holder and work clamp.
Figure 13:
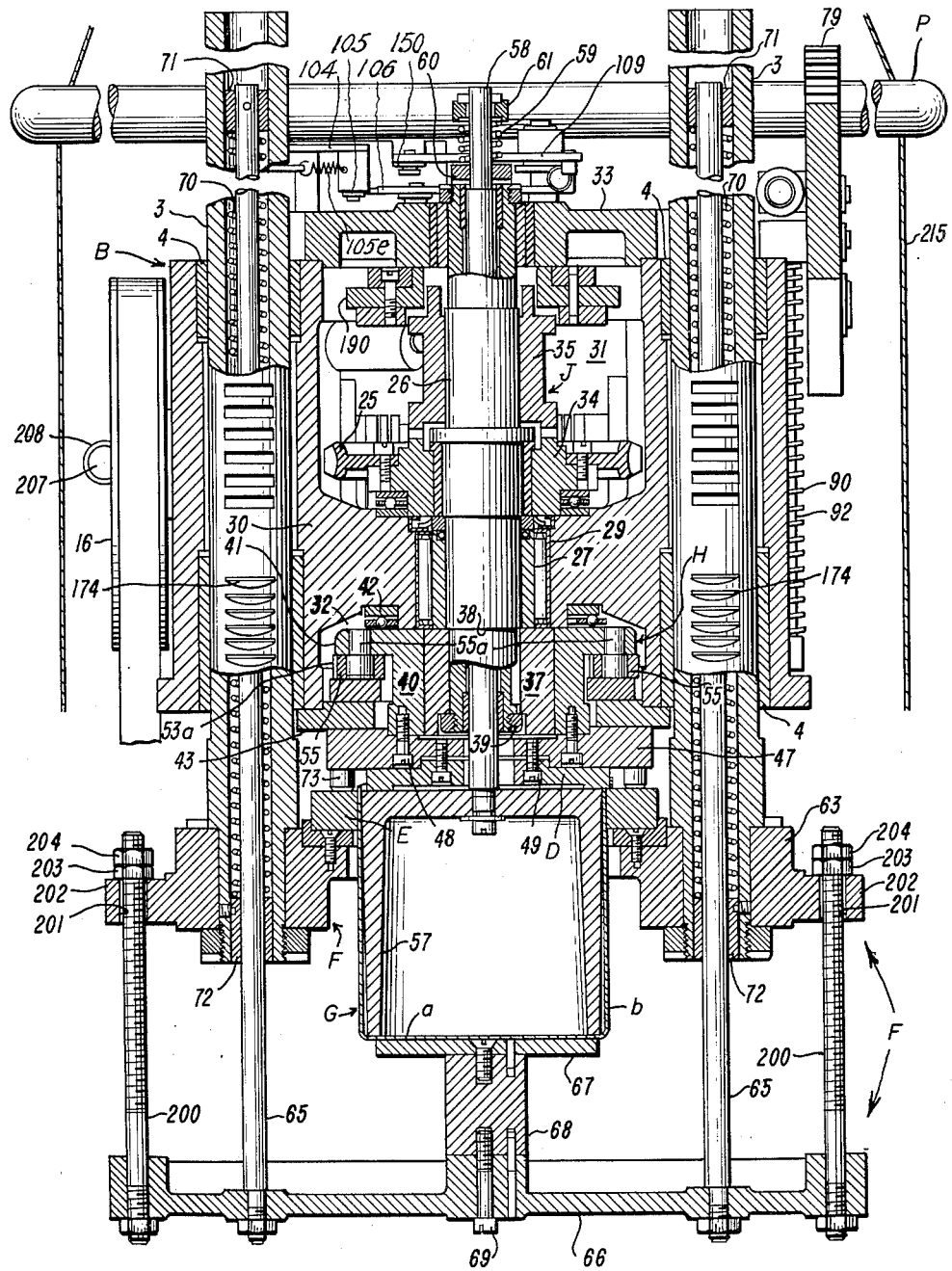
FIGURE 13 is a central vertical sectional view of the work head taken approximately on the plane of the line 13—13 of FIGURE 6 showing the vertical countershaft for the trimming cam, and a portion of the work piece being trimmed.
Figure 14:
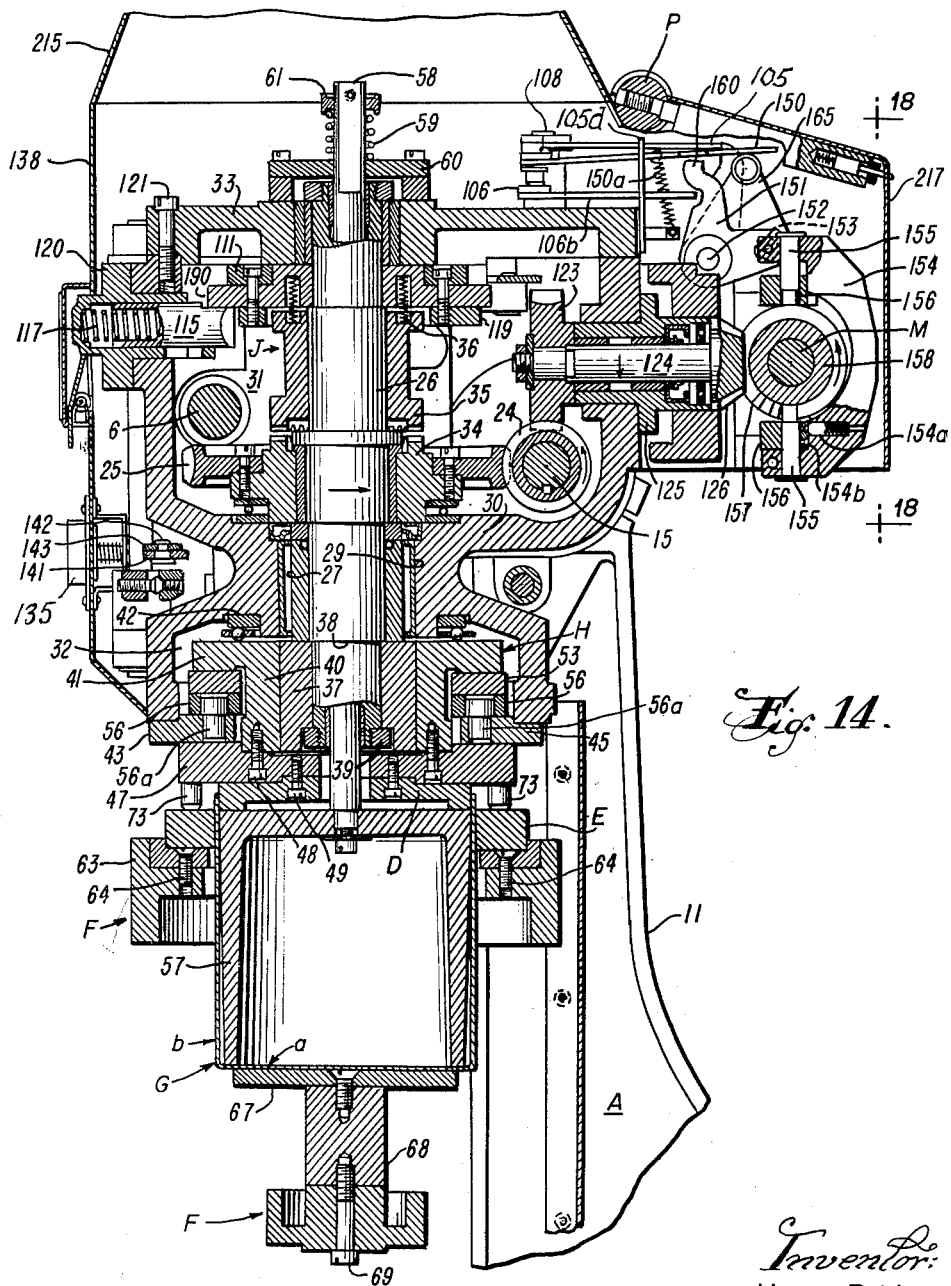
FIGURE 14 is a transverse vertical sectional view taken on the plane of the line 14—14 of FIGURE 6 with a portion of the main frame or supporting members shown in side elevation.

More particularly, the blocks 56 are mounted by pins 56a on a plate 43 of the secondary frame at diametrically opposite sides of the axis of the shaft 26 while the blocks 55 are mounted by pins 55a on the follower (FIGS. 10 and 13) at diametrically opposite sides of the axis of said shaft and in a diametral plane perpendicular to the diametral plane of the blocks 56 (see FIGURES 10 and 14). The guide ring 53 is disposed between the two sets of blocks 55 and 56 and has grooves 53a in which the respective blocks are respectively slidably fitted. With this construction, when the follower is urged to the right or to the left of FIGURE 10, the follower may slide along the blocks 55 on the ring 53, the ring being held against movement in that direction by the blocks 56, while when the follower is urged upwardly or downwardly in FIGURE 10 or to the left or to the right of FIGURE 14, the follower will slide along the ring 53 guided by the blocks 56, the ring being held against movement with the follower by the blocks 55.

A filler 57 carried by a rod 58 that extends through the countershaft 26 is normally held in abutting relation to the lower face of the punch by a compression spring 59 interposed between bridge bar 60 on the top of the cover plate 33 and a collar 61 on said rod, said filler plate being variable in depth or thickness to correspond to the depth of a given work piece to be operated upon. In FIGURE 14 the filler is in the form of a deep inverted cup to cooperate with the deep cup-shaped work piece G. It will be seen that the filler serves to accurately locate the edge of the annular wall of the work piece in proper relation to the cutting edges of the punch and die.

Figure 11:
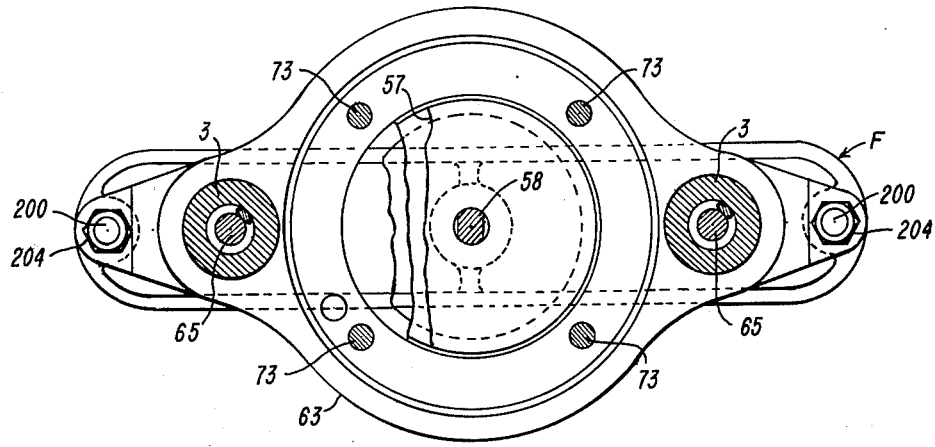
FIGURE 11 is a horizontal sectional view approximately on the plane of the line 11—11 of FIGURE 5, illustrating the die holder, punch, work piece and work engaging plate just prior to the trimming operation.

As hereinabove explained, the die E and the work piece are moved into work-operating position by the combined die support and work clamp F of the mounting for which the rack bars 3 form parts, the lower ends of the rack bars having connected thereto a die-carrying ring 63 on which the die E is separably secured by screws 64 (see also FIG. 12). A rod 65 is longitudinally slidable in each of the rack bars and the lower ends of said rods project beyond the rack bars and have connected thereto a work holder which includes a crossbar 66 at the center of which is mounted a work-engaging plate 67, said plate being spaced from the crossbar by a spacer sleeve 68 and being separably secured to the crossbar by a screw 69. The rods 65 are normally urged in the direction to move the work holder toward the punch by compression springs 70 mounted on the rods and interposed between guide heads 71 and guide sleeves 72 secured to the lower ends of the rack bars. Movement of the work holder in said direction is normally limited by engagement of the crossbar 66 with the ends of the rack bars, while movement of the die toward the punch is limited by spacer studs 73 projecting from the lower side of the punch carrying plate 47, said spaced studs being shown in FIGURES 11, 13 and 14.

Figure 5:
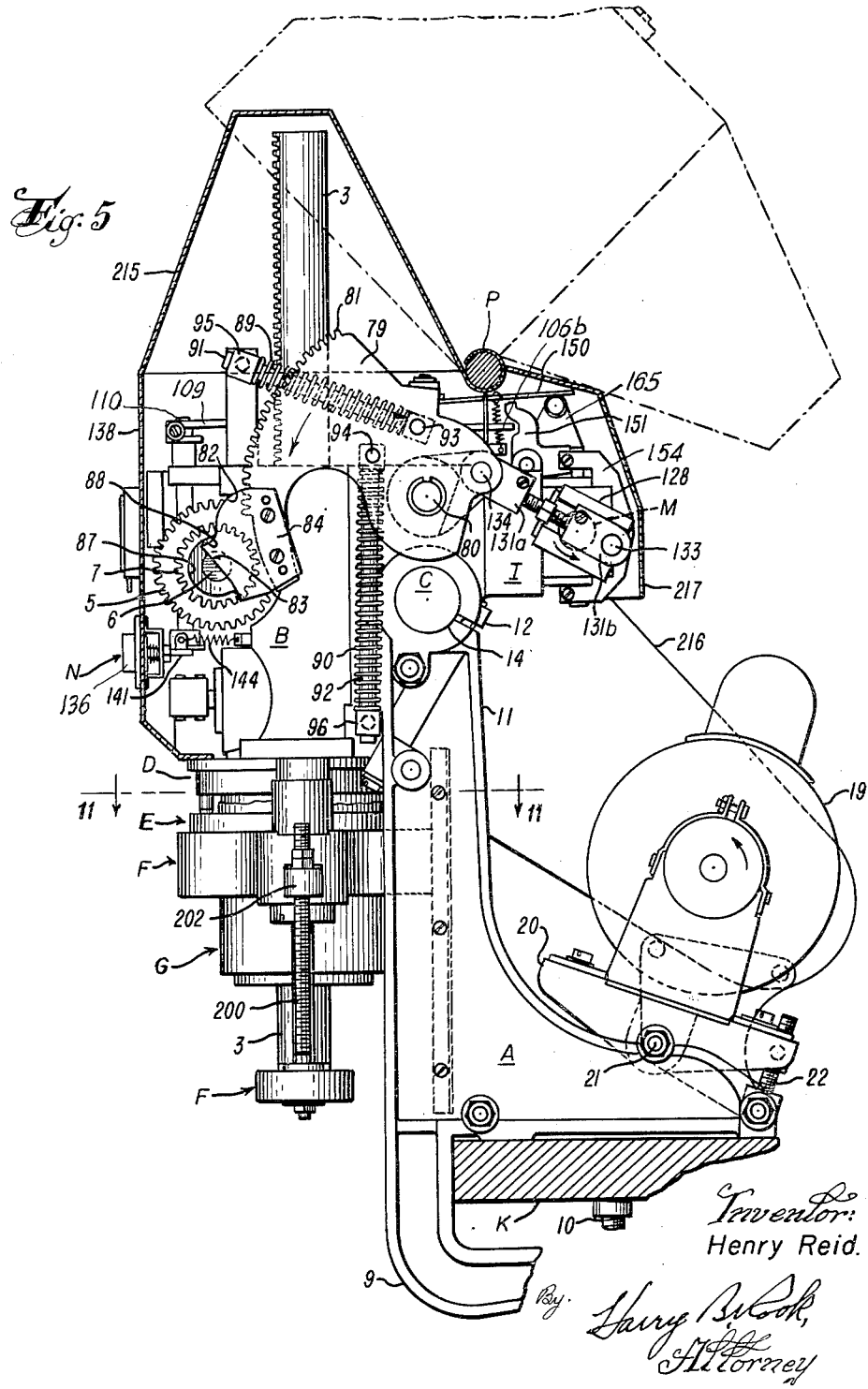
FIGURE 5 is another right elevational view of the right hand side of the machine, similar to FIGURE 1, but showing the combined die holder and work clamp in closed or trimming position.

The rack bars 3 are actuated by the pinion 7 and the mechanism I to move the combined die support and work clamp toward and away from the punch. When the die support and work clamp are in the open position as in FIGS. 1 and 3, the work piece G may be set upon or removed from the work holder. The mechanism I includes a gear segment 79 that is pivotally mounted on a stub shaft 80 mounted in a bearing 80a on the secondary frame B. The gear segment has a series of teeth 81 to mesh with the pinion 7 and having a sufficient number of teeth to move the die support and work clamp into work operating position and then to move out of mesh with the pinion 7, when the gear segment is swung upwardly into the position shown in FIGURE 5. Then the rack bars and die support are locked with the die in work operating relation to the punch as shown in FIGURES 5, 12, 13, 14 and 15. This lock is shown as comprising two cam surfaces 82 and 83 on a plate 84 fastened on the gear segment 79 that cooperates with two approximately diametrically opposite shoulders 85 and 86 on an approximately semi-circular extension 87 of the pinion 7. The cam surfaces and said shoulders cooperate in such a way as to apply rotative forces to the rack bars and at the same time cam-lock said gears, the rack bars and the die E in work operating position. In other words, the cam surfaces 82 and 83 in effect take the place of one or more gear teeth after the teeth of the series 81 have moved out of mesh with the pinion 7 as shown in FIGURE 5, and at the same time serve as a cam-lock which can be readily released when force is applied to the gear segment 79 to move it downwardly in FIGURE 5 toward the position shown in FIGURE 1.

In the machine shown in my Patent No. 2,759,541 the gear segment 79 is shown as hand operated by a crank, but according to the present invention the gear segment is automatically power operated by mechanism which will be hereinafter described, the gear segment being moved in the direction of the arrow on FIGURE 5 to release the cam lock and move the die support and work clamp away from the punch into the position shown in FIGURE 1. In accordance with the invention the weight of the rack bars, die and work clamp is in part counter-balanced by compression springs 89 and 90 which are mounted on respective rods 91 and 92 each of which has one end pivotally connected to the gear segment as indicated at 93 and 94, respectively, while the other ends of said rods are slidable through the corresponding blocks 95 and 96 which are rotatably mounted on the secondary frame. The points of pivotal connection of the rods to the gear segment and to the secondary frame are so related to the axis of swinging of the gear segment about the stub shaft 80 that the forces of the springs complement each other in counter-balancing the gear segment in the different positions through which it moves, the force of one spring becoming greater as the force of the other spring lessens, and vice versa, so that the forces necessary to raise the die holder into trimming position and then return the same to loading position are balanced.

Figure 2:
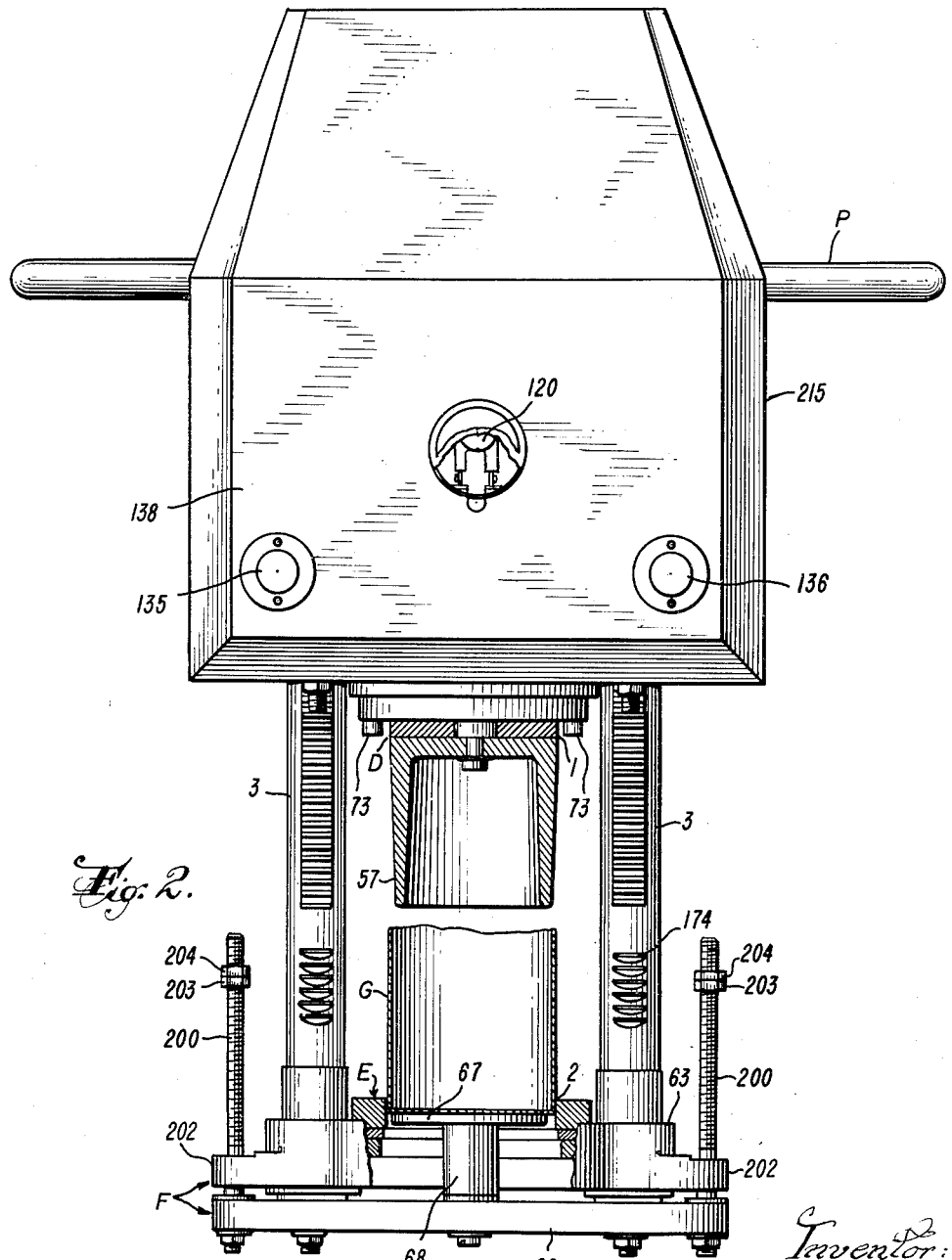
FIGURE 2 is a front elevational view of the machine with portions broken away and shown in section to illustrate the combined die holder and work clamp in open or loading position and a work piece in position preliminary to movement of the die holder into closed position.

It will be observed that when the combined work support and die are moved upwardly, the work piece is clamped between the work holder 67 and the filler 57, the work being held in position under the force of the compression springs 70 (FIGS. 13 and 14), and when the die support and work clamp are moved away from the punch, the work piece will be ejected from the die by the action of the springs 70 on the work-engaging plate 67 and the work piece may be removed from the die (FIG. 2). Movement of the work support and die away from the punch may be limited by engagement with a stop stud 6a on the frame with a stop lug 6b rigidly carried by the shaft 6.

By tilting the secondary frame about the axis C as shown by dot and dash lines in FIGURE 1 the work piece will more readily fall from the machine, and work clamp, die support and punch can be made accessible rapidly and easily for adjustment or replacement.

As above stated, the gear segment 79 is automatically power operated, and in the present instance is operated by mechanism which includes a control shaft M which is journaled in bearings 122 mounted on the secondary frame at the rear of the machine. The control shaft M is driven by and from the drive shaft 15 by means of a worm gear 123 that meshes with the worm 24 on the shaft 15 (FIGURES 8 and 14) and is fixedly mounted on a jack shaft 124 that is journaled in a bearing 125 in the secondary frame and has connected thereto a bevel pinion 126 which meshes with a bevel pinion 127 which is rotatably mounted on the control shaft M. Projecting longitudinally from one end of the control shaft M is a rectangular crank arm 128 in which a block 129 is mounted for sliding adjustment radially of the shaft by a shouldered adjusting screw 130 the shoulder of which abuts one end of the crank arm while the other end engages said block. A link comprising two sections 131a and 131b adjustably connected by a right and left hand threaded screw 132 has one end pivotally connected to the block at 133 and its other end pivotally connected to the gear segment 134. With this construction, it will be understood that during one complete revolution of the control shaft, the segment 79 will be swung alternately in opposite directions to clamp and release the work in and from work-operating relation to the punch and die, respectively. Explanation of the starting and stopping of the control shaft will be given hereinafter.

Figure 8:
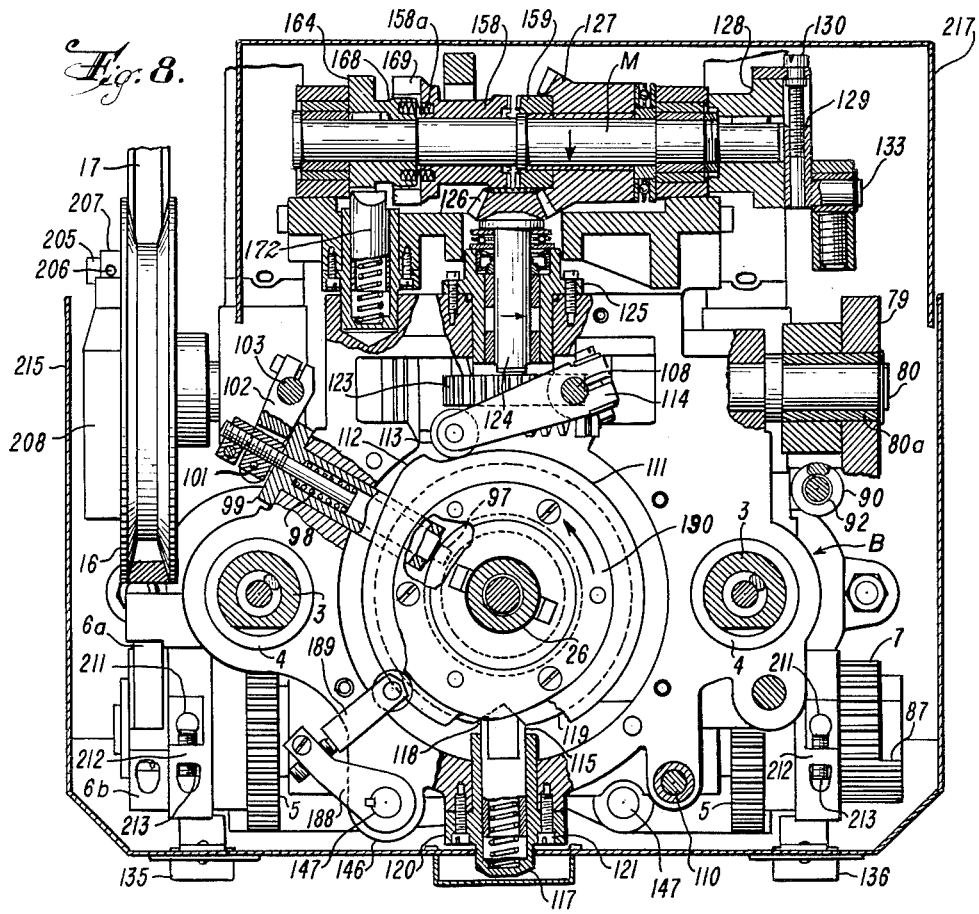
FIGURE 8 is a partial horizontal sectional view approximately on the plane of the line 8—8 of FIGURE 1 with the cover of the work head removed and with portions broken away and shown in section.
Figure 9:
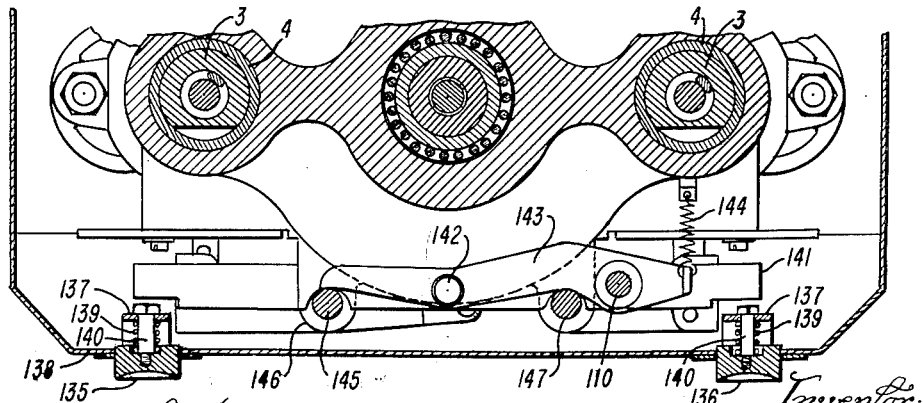
FIGURE 9 is a fragmentary horizontal sectional view approximately on the plane of the line 9—9 of FIGURE 1, showing the dual safety push buttons for starting the machine cycle.

Simultaneously with the clamping of the work piece in work-operating position, the actuation of the punch is started and this result is effected by a mechanism about to be described. The upper clutch element 35 has a lug 35a beneath which the nose of a starting pin 97 is normally positioned to hold the clutch elements out of engagement as shown in FIGURES 8, 14 and 17. Said starting pin is normally influenced into a position beneath said shoulder by a compression spring 98 and the shank of the pin projects from a guide housing 99 that is removably mounted in the secondary frame. The projecting shank of the starting pin is pivotally connected at 101 (FIGURES 6 and 8) to an arm 102 which is rigidly connected to a stub shaft 103 which is journaled in the cover plate 33 and has another arm 104 (FIGURE 6) that is pivotally connected to a push link 105 that is actuated upon rotation of the control shaft M the starting of which is initiated by mechanism later to be described but including a push button starting mechanism generally designated N. Normally when the machine is at rest the nose of the starting pin 97 lies beneath the lug 35a of the clutch member, and the push button mechanism is in normal inactive position. When the push button mechanism is manually actuated to start the machine, the control shaft M makes a half revolution from the position shown in FIG. 1 to that illustrated in FIG. 5. At the completion of the half revolution, through mechanism to be hereinafter described, the arm 104 is swung in the direction to cause withdrawal of the starting pin 97 from beneath the lug 35a of the clutch 35.

The parts are shown in the drawings in the positions assumed prior to the complete withdrawal of the starting pin and just prior to the starting of the control shaft M on its first half revolution to actuate the gear segment 79 and clamp the work piece G for work-operating position. When the push buttons are actuated, the work is clamped in work-operating position and upon complete withdrawal of the starting pin, the clutch member 35 is forced into engagement with the clutch member 34 so as to cause rotation of the countershaft 26 and consequent actuation of the punch, it being understood that the driving shaft 15 will be continuously driven by the motor 19 so as to drive the worm gear 25 and the clutch member 34 (FIGS. 13 and 14) and cause consequent actuation of the punch. The punch is moved through successive cycles, each cycle comprising a plurality of steps in succession in the same direction around the axis of the die, each step consisting of movement of the punch along a straight line to and from a central position concentric with the die. In the present case the follower 40 being foursided, there are four steps and the punch is moved along straight lines each perpendicular to one side of the follower. Upon each movement of the punch from the central position, the cutting edge of the punch cooperates with the cutting edge of the die to cut the work as best shown in FIGURES 14 and 13, the former of which shows the punch in its central position and the latter of which shows the punch moved to the right of its central position so as to cut the work piece G. This cycle is effected during one complete revolution of the countershaft 26 and rotation of the countershaft is automatically stopped at the end of each revolution by means including a cam 111 connected to the upper clutch element (FIGURES 14 and 16), which has a major portion of its periphery concentric with the cam but has a cam lobe 112 which engages a follower roller 113 on an arm 114 which is rigidly connected to a stub shaft 108 so that when the cam lobe strikes the follower roller 113, the starting pin will be released by mechanism later to be described in more detail, to permit entrance into the path of the lug 35a in such a way that the lug will ride upon the pin and elevate the clutch element 35 out of engagement with the clutch element 34 as shown in FIGURES 14 and 17 to thereby stop the rotation of the countershaft 26. Thereupon a stop pin 115 having a wedge-shaped nose will be projected by a compression spring 117 into a V-shaped notch 118 in a stop ring 119 that is fast secured to the cam 111 (FIGURES 8 and 14). Preferably the stop pin and its spring are mounted in a housing 120 that is separably attached to the secondary frame by a screw 121.

The starting of the operation of the machine is manually controlled by a safety starting lever mechanism that includes two push buttons 135 and 136 (FIGS. 2, 6, 9 and 14) that are mounted in brackets 137 on the front wall of the machine cover 138 and are normally influenced outwardly into inactive position by compression springs 139 each of which surrounds the shank 140 of the corresponding button and interposed between the bracket 137 and the button. The shank 140 of each button engages one end of a floating link 141 that is pivotally connected at the midpoint of its length, as indicated at 142, to a lever 143 which is fast connected intermediate its ends to the shaft 110 mounted in bearings 110a (FIG. 12) and is normally urged in one direction by a spring 144 connected to one end of the lever, said movement being limited by abutment of the other end of the lever against a shaft 145 that is mounted in bearings 146 on the front of the secondary frame. With this construction, when both push buttons are pushed at the same time the floating link 141 is pushed inwardly away from the operator and through the pivot 142 swings the lever 143 so as to rotate the shaft 110 in one direction; and it will be obvious that it is necessary to push both buttons at the same time in order to impart the required movement to the shaft 110. The floating link is returned to its normal position by the spring 144 into abutment with the shaft 145 and another similar shaft 147 that is mounted in bearings 148 and 149 on the front of secondary frame, the bearing 148 being shown as integral with the lower bearing 110a.

At the upper end of the shaft 110 (FIG. 6) is fast connected an arm 110b that has a pin and slot connection 110a with one arm of a bell crank lever 109 which is loosely rotatable on a shaft 108 journaled in the cover 33 of the secondary frame. The other arm of the bell crank lever 109 is pivotally connected at 109b to a starting link 150 which actuates a clutch bell crank 151 pivotally mounted at 152 on the secondary frame and having a slot and roller connection 153 with a clutch yoke 154 that has pins 155 rigidly connected thereto and slidably mounted in bearings 156 on the secondary frame (FIGURES 14, 18 and 21). The pins 155 are alternately cooperative with a cam projection 157 on one side of a circumferential slot in a clutch member 158 that is mounted on the control shaft M for longitudinal sliding movement relatively thereto and for rotation therewith by a finger and slot connection 169 with a disk 168 that is keyed on the shaft; and the member 158 is normally urged by springs 158a into coactive clutched relation with a clutch element 159 that is rigidly connected to the bevel gear 127 which is rotatable on the control shaft M (FIGURES 8 and 14).

The yoke is held in each of its two positions with one clutch pin or the other in the slot of the member 158 by means of a spring detent plunger 154a mounted in the yoke and coacting with a detent plate 154b on one of the bearings 156 having recesses in one of which the spring detent plunger 154a is seated in each position of the yoke.

The yoke bell crank 151 has a reduced upper end 160 which, when the machine is at rest normally, is positioned in a notch 161 on the starting link 150 (FIGURES 6 and 21), and in this position the upper yoke pin 155 will be positioned in the slot of the clutch element 158, having coacted with the lug 157 to disengage the clutch elements 158, 159. A spring 150a normally urges the link 150 toward the bell crank.

Figure 6:
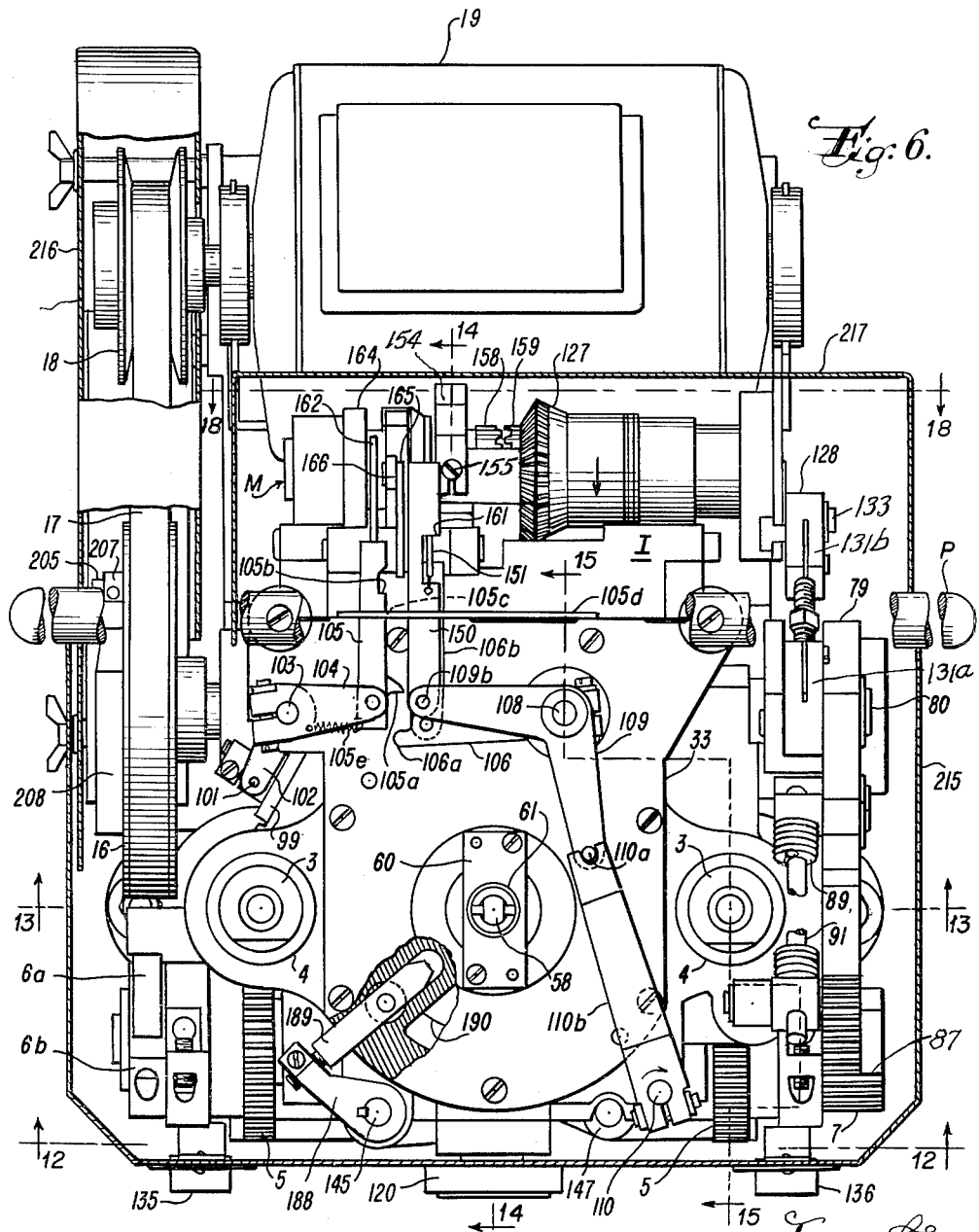
FIGURE 6 is a top plan view of the machine with the casing and certain portions of the machine broken away and shown in section to illustrate the machine trip control mechanisms in their positions assumed immediately prior to the start of the machine cycle.

When the push buttons are simultaneously pushed, the shaft 110 is rotated in the direction of the arrow in FIGURE 6 so as to swing the bell crank 109 and pull the starting link 150 so as to swing the yoke bell crank 151 to the right in FIGURE 21 and thus actuate the yoke to move the lower yoke pin into coactive relation to the lug 157 and thereby cause an engagement of the clutch elements 158, 159 (FIG. 22) so as to start the first half revolution of the control shaft M. Upon completion of the first half revolution of the shaft from the position shown in FIG. 19, a cam ended trip bell crank 162 is actuated by a roller 163 on a trip disk 164 so as to exert push on a push link 105 (FIGURES 6 and 19) and thereby swing the arm 104 that is connected to the stub shaft 103 (FIGURES 6 and 8) so as to start the revolution of the countershaft 26, and thereby begin the trimming operation, by actuation of the starting pin 97 and consequent engagement of the clutch elements 34 and 35. The starting pin 97 is locked in starting position by engagement of a notch 105b of the link 105 under influence of a spring 105e on the link with the edge of a slot 105c in a guide plate 105d for the link 105 that is rigidly mounted on the cover 33. The countershaft will then continue to rotate for one complete revolution but the operation of the control shaft will have been stopped at one-half of a revolution by engagement of the lower yoke pin with the lug 157 of the clutch element 158 to disengage the clutch elements 158, 159.

To prevent undesired or accidental operation of the control shaft through the manipulation of the push buttons after a machine cycle has started, an intermediate bell crank 165 has a roller 166 underlying the end of the starting link 150 (FIGURE 21) and another roller 167 engaging a cam disk 168 that is keyed on the control shaft and has a finger and slot connection 169 with the clutch element 158 (FIGS. 18, 21 and 22). The cam disk has a cam surface 170 which during the loading of the work into the machine is in the position shown in FIGURE 21 but upon starting of the rotation of the control shaft, said cam swings the intermediate bell crank so as to lift the starting link 150 out of engagement with the yoke bell crank (FIGS. 5 and 14) until the control shaft completes its second half revolution. At the end of the revolution of the countershaft 26 the cam 111 engages the follower roller 113 on the arm 114 that is connected to the stub shaft 108 so as to push a lever 106 into engagement with the yoke bell crank through a link 106b and move the latter in a clockwise direction (FIGURE 14) so as to actuate the yoke 154 and its pins 155 and thereby start the second half of the revolution of the control shaft M during which the gear segment 79 will be swung to release the work from the combined die holder and work clamp. An extension 106a on the lever 106 then strikes a lug 105a on the link 105 so as to tilt the link 105 and release its notch 105b from the edge of the slot in the catch plate 105d, whereby the starting pin 97 is released so as to permit the disengagement of the clutch elements 34, 35 and stop the trimming operation.

For the purpose of positively and accurately stopping the rotation of the control shaft, a spring plunger 172 having a V-shaped nose engages one of two notches 173 in the disk 168.

Figure 12:
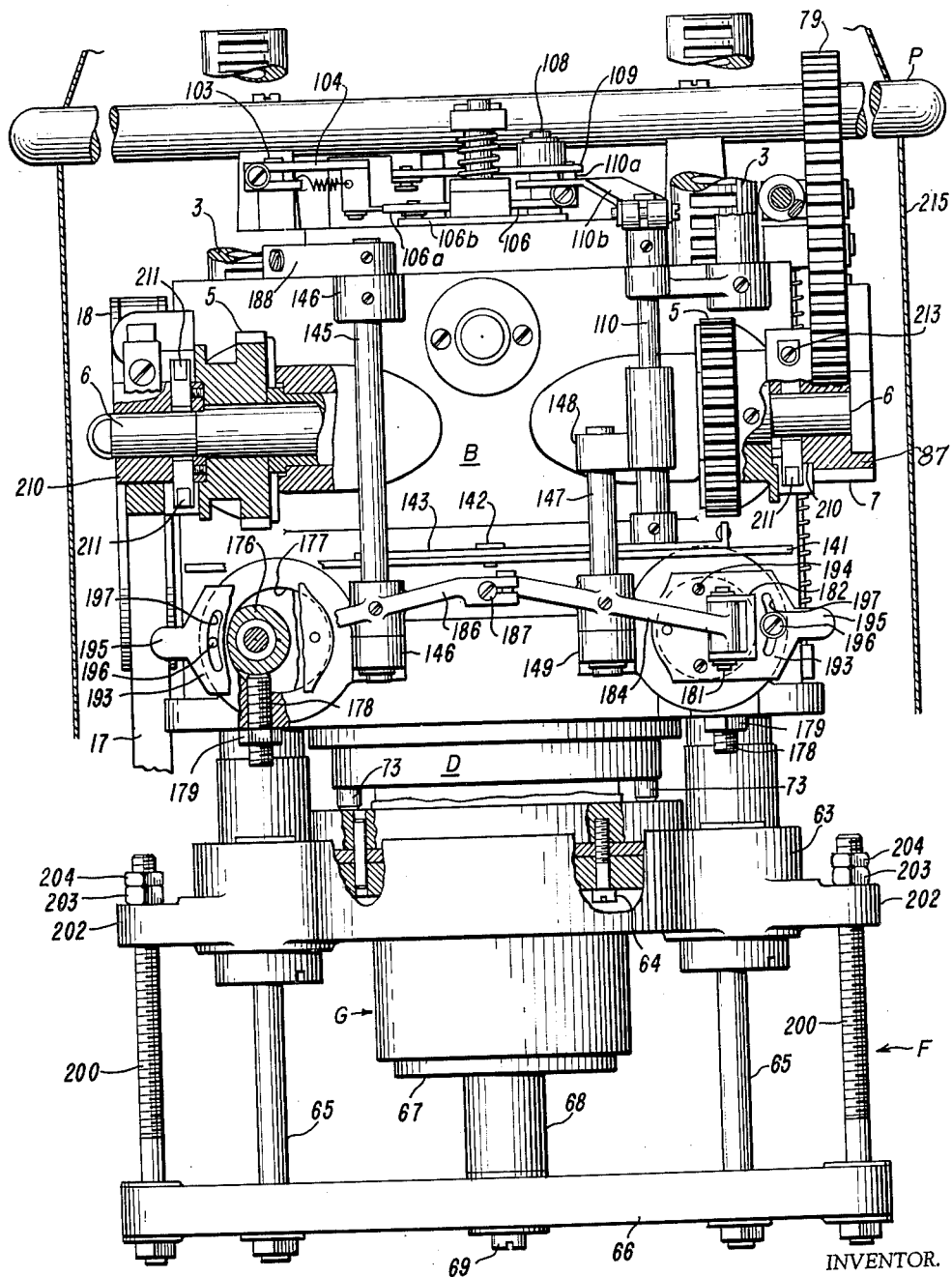
FIGURE 12 is a front elevational view of the work head with portions broken away and shown in section, taken approximately on the plane of the line 12—12 of FIGURE 6 and showing the work piece in position to be trimmed.

From the foregoing it will be understood that after the work has been positioned on the work holder as shown in FIGURE 2, the push buttons will be operated and through shaft 110, bell crank 109, starting link 105, yoke bell crank 151 and yoke 154 will be actuated to engage clutch 34, 35 and cause one-half of a revolution of the control shaft M, during which the gear segment 79 will be operated to move the die holder and work clamp into work operating position as shown in FIGURES 12, 13 and 14. Thereupon, through the roller 163, push link 105, arm 104, and the starting pin 97, the counter-shaft 26 will be started so as to actuate the punch, and this will continue throughout one complete revolution of the counter-shaft during which the control pin 97 will be locked in clutch-engaging position and the trimming operation will be performed. At the end of one revolution of the counter-shaft 26, the arm 106 will be actuated by the cam 111 and shaft 108 so as to actuate the clutch yoke 150 and engage the clutch members 158 and 159 and thereby start the control shaft through he second half of its revolution, during which the die holder and work clamp will be actuated by the gear segment 79 into normal open position as shown in FIGURES 1 and 2, the starting pin will be released by actuation of the lever 106 by the cam 111 and consequent release of link 105 to permit disengagement of the clutch elements 34, 35, as the result of which the operation of the machine will automatically stop until the push buttons 135 and 136 are manually operated again.

It is another feature of the invention to provide means for positively locking the die holder and work clamp in work-operating position to firmly hold the work during the trimming operation and to maintain the desired relationship between the cutting edges of the punch and die. For this purpose hte lower end of each rack bar 3 is provided with a series of teeth 174 (FIGURES 13 and 15), and a locking dog 175 cooperates with each series of teeth to selectively lock and unlock the rack bars against movement in the direction incident to movement of the die holder and work clamp away from the punch. As shown, each dog 175 (FIGS. 10, 12 and 15) is slidable in a mounting member 176 that is rotatably mounted in a recess 177 in the secondary frame. Each locking dog is disposed eccentrically with respect to its mounting member as best shown in FIGURES 10 and 12, and each mounting member is adjustable by rotation thereof in the corresponding recess 177 through adjustment of an adjusting screw 178 that is screw threaded in the machine frame and is locked in adjusted position by lock nut 179. The purpose of this adjustment is to compensate for any slight misalignment that may occur between the teeth of the locking dog and the teeth 174 on the rack bars and to compensate for the removal of material when grinding down the punch and die surfaces as reconditioning is required.

For actuating the locking dogs simultaneously, each dog has a shank 180 that has a pin and slot connection 181 with a channel shaped link 182. One of the links 182 is pivotally connected at 183 to one end of a lever 184 which is fast connected intermediate its ends to the shaft 147. The other link 182 is pivotally connected at 185 to one end of a lever 186 that is fast connected intermediate its ends to the shaft 145. The other ends of the two levers 184 and 185 have a mutually abutting relationship and one lever has an abutment screw 187 for adjusting the contact between the two levers. The upper end of the shaft 145 has fast connected thereto an arm 188 which has an abutting relation to one end of a cam follower 189 that is slidably mounted in a slot in the cover 33 (FIGS. 6, 8 and 12) and carries a roller that follows a cam 190 on the counter-shaft 26. Compression springs 192 normally bias the locking dogs 175 toward the rack bars and at the same time normally hold the cam follower 189 in contact with the cam 190; and the lobe of the cam 190 is normally so positioned as to hold the locking dogs in their positions to release the rack bars for movement as shown in FIGURE 10. Upon starting of each revolution of the countershaft 26 the cam 190 releases the cam follower so that the locking dogs 175 are forced into engagement with their respective teeth so as to positively lock the die holder and work in proper work-operating relation to the punch.

For convenience in manipulation of the eccentric mounting members 176, an actuating plate 193 may be fixedly connected by screws 194 to each mounting member and have a finger piece 195 so that by pushing upwardly or downwardly on the finger piece the mounting member may be rotated in one direction or the other. A locking screw 196 threaded into the machine frame and passing through a slot 197 in the actuating plate may be provided for clamping the mounting member in its adjusted position, it being understood that the screws 178 will resist rotation of the mounting members under the influence of pressure on the rack bars 3 tending to separate the die holder from the punch.

Figure 3:
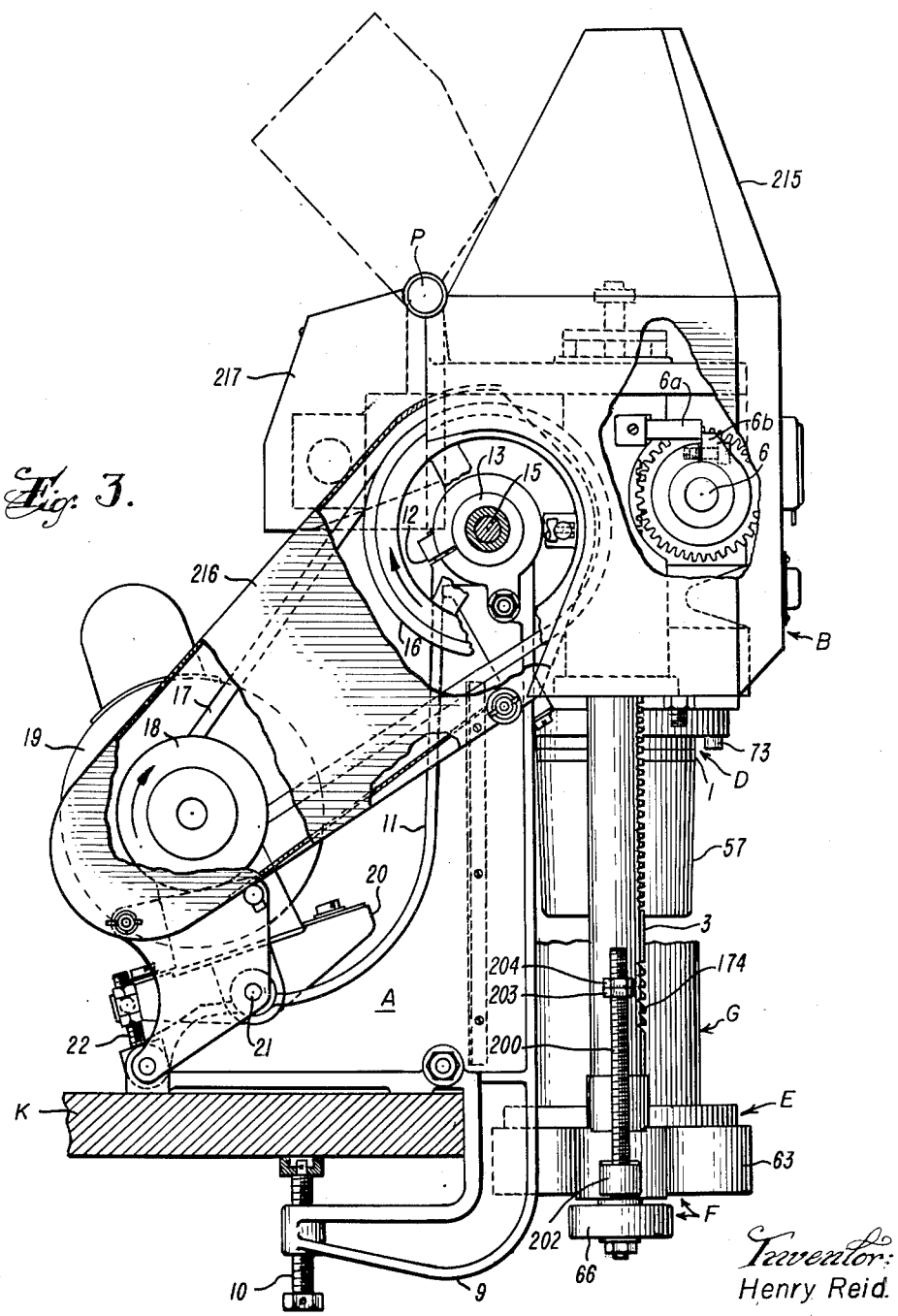
FIGURE 3 is an elevational view of the left hand side of the machine as illustrated in FIGURE 1 with portions of the belt casing and parts of the machine broken away to show the motor drive.
Figure 4:
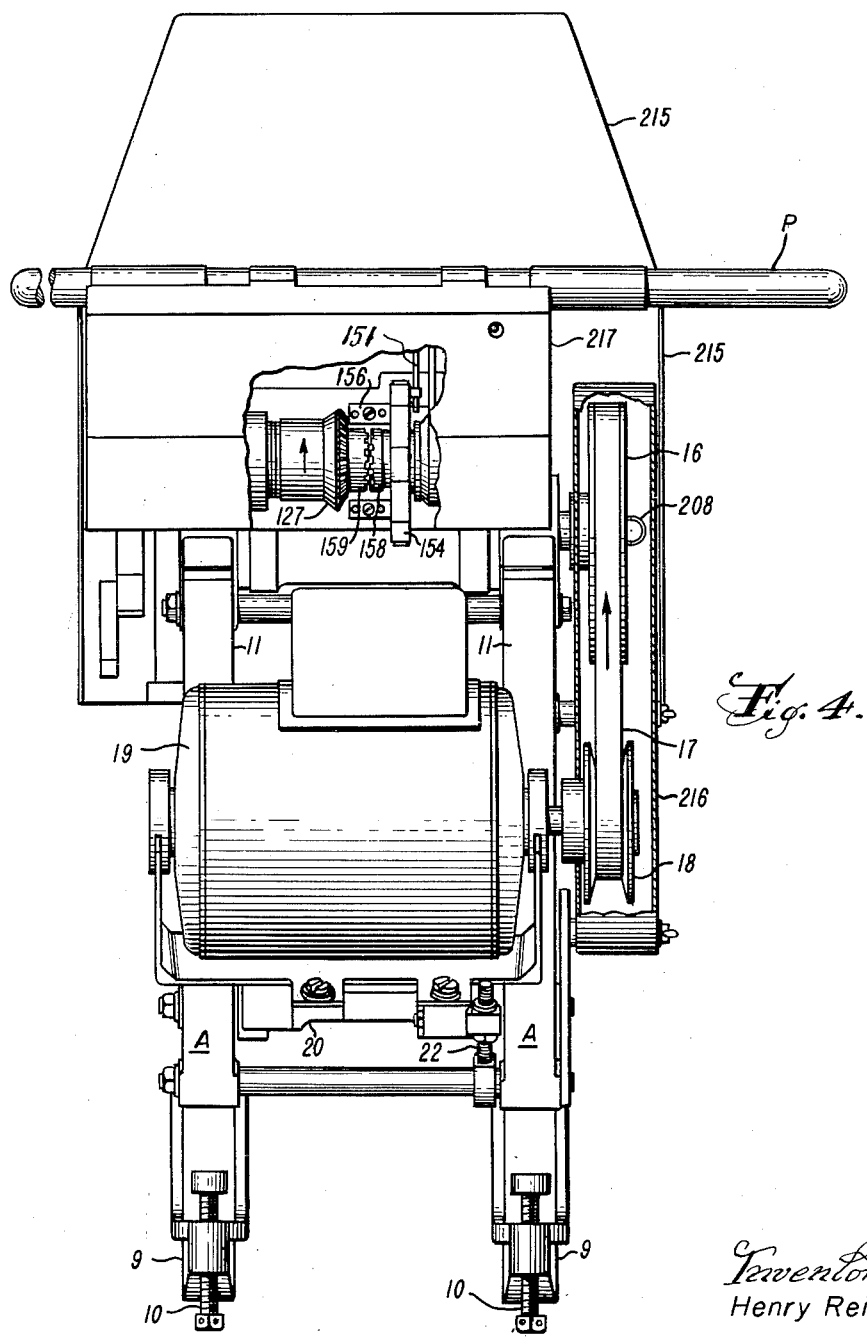
FIGURE 4 is a rear elevational view of the machine showing the motor mounting adjustment and with portions of the main drive shaft casing broken away to show the main drive shaft beveled gear and its associated clutch members.

It may also be desirable to provide means for adjusting the spaced relationship of the work support 66, 67 and die holder 63, and for this purpose I have shown two threaded rods 200 each having one end rigidly connected to the work holder bar 66 and its other end slidably mounted in an opening 201 in a lug 202 at one end of the die carrying member 63. Adjusting and lock nuts 203 and 204 are provided for locating and holding the work holder bar 26 in the desired relation to the die carrying member as best shown in FIGURES 2, 3 and 12. In FIGURE 2 the work holder bar is shown in its uppermost position with respect to the die carrying member to facilitate loading of the work into the machine, while FIGURES 12, 13 and 14 show the work holder bar in its most distantly spaced relation to the die carrying member during the trimming operation.

In many instances it may be desirable to manually drive the machine, particularly for adjustment of the parts and trial operations, and for this purpose the drive pulley 16 has a handle which includes a mounting stud 205 (FIGURE 7) secured in the pulley and having pivotally connected thereto at 206 a handle rod 207 on which is slidable a handle grip sleeve 208 that is normally influenced into engagement with the stud 205 by a spring 209. Normally, the handle rod 207 and the sleeve 208 will be disposed alongside and parallel with the general plane of the drive pulley, but when it is desired to use the handle, the sleeve 208 will be pulled away from the stud 205 from the position shown in FIGURE 7, after which the rod 207 will be swung into alignment with the stud 205, whereupon the sleeve may be released so that the spring will press the end of the sleeve against the stud and thus hold the rod and sleeve in position for rotating the drive pulley.

It will be observed that the worm gear 25, the clutch members 34, 35 and the cam 111 and countershaft 26 can be easily removed as a unit from the upper recess 31 of the secondary frame upon removal of the cover 33.

Figure 7:
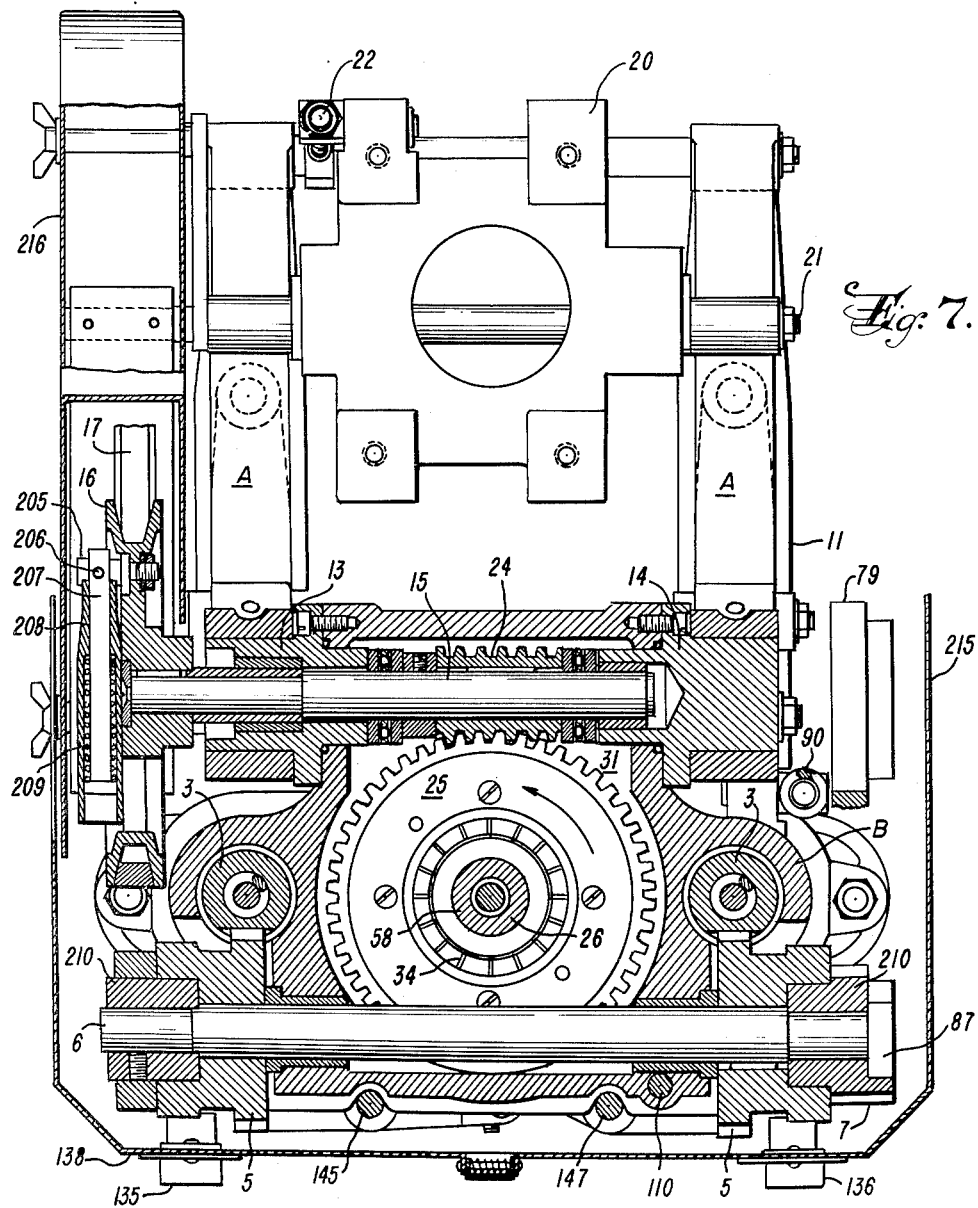
FIGURE 7 is a partial horizontal sectional view approximately on the plane of the line 7—7 of FIGURE 1, with the motor omitted, showing the drive gearing, the shaft for actuating the rack bars of the work clamp.

It is desirable to provide some adjustment for the rack bars 3 and gears 5 and accordingly, I have shown the gears adjustably mounted on their shaft 6. More particularly, a collar 210 is mounted on the shaft 6 for each gear 5, one collar being pinned to the shaft and the corresponding gear being rotatable on the shaft, while the other gear is pinned to the shaft and its corresponding collar is rotatable on the shaft and is fast connected to the pinion 7 (FIGURE 7). Each collar has a pair of studs 211 and each gear has a lug 212 juxtaposed to each stud. In each lug is adjustably mounted a screw 213 in abutting relation to the corresponding stud 211 so that by adjusting the screws 213 the gears may be adjusted to cause the racks to move in proper relation to each other or to be elevated in unison to raise the die-carrying ring slightly and compensate for material removed when it becomes necessary to renew the cutting edges of the punch and die.

To facilitate handling of the machine a handle bar P is fastened to the rear edge of the cover plate 33.

Preferably the upper portion of the secondary frame will be enclosed in a housing 215 and the belt and pulley connection 16, 17, 18 is enclosed in a housing 216, and the housings are preferably pivotally connected to each other and to the frame for easy access to the machine parts. For convenience, the housing 215 is pivotally connected to the handle bar P as is also a housing 217 for the control shaft and associated parts.

The operation of the machine probably will be understood from the foregoing but a brief description thereof may be helpful. Assuming the machine to be in idle condition with the die E in spaced relation to the punch and with the combined die support and work piece clamp F in position to receive a piece of work, and assuming that the motor is running, after the work piece has been placed in the work clamp, to start the machine, both push buttons are simultaneously pushed, one by each hand of the operator. Thereupon, the control shaft M is started into operation for the first half of its revolution as to cause the gear segment 79 to be swung in the direction to lift the work piece and clamp it in proper trimming position with respect to the punch and die. When the work piece is clamped in trimming position, the clutch 34, 35 is engaged and the power is transmitted, through the driving shaft 15 and the clutch, to the cam shaft 26 which is then rotated for a complete revolution so as to actuate the cam 40 and thereby the punch D, as hereinbefore described, to trim the work piece.

At the completion of one revolution of the cam shaft 26, the control shaft M is released for the second half of its revolution, and during said second half of the revolution of the control shaft, the die holder and work clamp will be actuated by the gear segment 79 into normal open position as shown in FIGURES 1 and 2 to permit removal of the trimmed work piece, and the operation of the machine will automatically stop until the push buttons 135 and 136 are manually operated again.

While the preferred embodiment of the invention has been illustrated for the purpose of explaining the principles of the invention, it will be understood by those skilled in the art that the construction of the machine may be widely modified within the spirit and scope of the invention.

I claim:
1. In a machine for operating upon a workpiece comprising a frame, a punch mounted on the lower end of said frame, a die, said die and punch having coacting portions to receive between them and operate upon said workpiece, driving means including a motor for actuating said punch to cause coaction of said punch and die upon said workpiece, a combined die support and work clamp beneath said punch, mounting means on said frame providing for movement of said die support and work clamp toward and away from said punch so as to move and to release a workpiece and said die into and from work-operating relation to said punch, respectively, mechanism to move said die support and work clamp into and out of work-operating position, said mounting means and said mechanism including rack bars carrying said die support and work clamp longitudinally vertically slidably mounted in said frame, means for sliding said rack bars including a gear journaled on the frame meshing with each rack, a pinion drivingly connected to said gears, a gear segment pivotally mounted on a horizontal axis on the frame and meshing with said pinion for rotating said gears to move said die support and work clamp into work-operating position, the combination with said mechanism and mounting means of control means drivingly connectable to said driving means and including a control shaft rotatable in timed relation to said driving means to cause application and release of power from said motor to and from said mechanism, respectively, a driving connection between said control shaft and said gear segment to swing the gear segment about its pivotal mounting on the frame, and locking means for positively holding said die support and work clamp in work-operating position.

2. In a machine as defined in claim 1 wherein the die support is rigidly connected to said rack bars, said work clamp is mounted on and movable relatively to said die support, there are springs associated with said rack bars for normally urging said work clamp toward work-operating position, and with the addition of spring means including two compression springs each having one end connected to said gear segment between the pivotal mounting of said segment on the frame and said pinion with which the gear segment meshes, the other ends of said springs being connected to said frame at opposite sides of said pivotal mounting of the gear segment, providing for yielding resistance by said spring means to movement of said gear segment and the work clamp in both directions and for overcoming the increased compression of the first-mentioned springs during movement of the work clamp into work-operating position and thereby reducing shocks incident to movement of the die support and work clamp into and out of work-operating position.

3. A machine as defined in claim 1 wherein there is a driving shaft having a driving connection with said motor, journaled in said frame, and there is a driving connection between said driving shaft and said control shaft including a clutch mechanism for drivingly connecting and disconnecting said control shaft to and from said driving shaft, respectively, and with the addition of automatic means for actuating said clutch to drivingly connect and disconnect said control shaft to and from said driving shaft in timed relation to the stopping and starting of said punch, respectively.

4. A machine for operating upon a workpiece, comprising a frame, a punch mounted on the lower end of said frame, a die, said die and punch having coacting portions to receive between them and operate upon said workpiece, driving means for actuating said punch to cause coaction of said punch and die upon said workpiece, a combined die support and work clamp beneath said punch, mounting means on said frame providing for movement of said die support and work clamp toward and away from said punch so as to move and to release a workpiece and said die into and from work-operating relation to said punch, respectively, a driving shaft and a motor drivingly connected thereto, mechanism to move said die support and work clamp into and out of said work-operating position, and apparatus for connecting said driving means and said mechanism to said driving shaft to move said die support and work clamp toward and away from said punch in timed relation to the starting and stopping of said driving means, said apparatus including a control shaft, a driving connection between said driving shaft and said control shaft including a clutch, and means including manually operable push buttons for initially actuating said clutch to connect said control shaft to said driving shaft and automatic means to start and stop said driving means for actuating the punch in timed relation to the movement of said die support and work clamp toward and away from said punch, respectively.

5. A machine as defined in claim 4 wherein said means for initially connecting the driving shaft to the control shaft includes two coactive clutch elements one of which has a continuous driving connection with said driving shaft and the other of which is rotatable with and relatively slidable longitudinally on said control shaft, a yoke having clutch pins and being movable to cause alternate coaction of said pins with the second mentioned clutch element for causing the initial starting of said control shaft, said clutch yoke being actuated by said push buttons to initially start the control shaft, and said automatic means including parts driven by said control shaft and elements actuated by said driving means coactive with said parts.

6. A machine for operating upon a workpiece, comprising a frame, a punch mounted on the lower end of said frame, a die, said die and punch having coacting portions to receive between them and operate upon said workpiece, driving means for actuating said punch to cause coaction of said punch and die upon said workpiece, a combined die support and work clamp beneath said punch, mounting means on said frame providing for movement of said die support and work clamp toward and away from said punch so as to move and to release a workpiece and said die into and from work-operating relation to said punch, respectively, a driving shaft and a motor drivingly connected thereto, mechanism to move said die support and work clamp into and out of said work-operating position, and apparatus for selectively connecting said driving means and said mechanism to said driving shaft to move said die support and work clamp toward and away from said punch in timed relation to the starting and stopping of said driving means, and a locking means for positively holding said die support and work clamp in said work-operating position.

7. A machine as defined in claim 6 with the addition of means actuated by said driving means upon starting and stopping thereof for actuating and releasing said locking means into and out of locking position, respectively.

8. A machine as defined in claim 7 wherein said mounting means and said mechanism include rack bars longitudinally slidably mounted in said frame, a horizontal shaft journaled in said frame, a gear on said shaft meshing with each of said rack bars, an operating means for rotating said gears including a pinion fast connected to said gears, means engaging said pinion to actuate said horizontal shaft to actuate said rack bars for moving said die support and work clamp into and out of work-operating position, and wherein said lock comprises teeth on said rack bars, locking dogs movably mounted on said frame and an actuating connection between said driving means and said dogs for moving the dogs into and out of engagement with said teeth in timed relation to the starting and stopping of said punch.

9. A machine as defined in claim 8 wherein said actuating connection includes two levers each pivotally mounted on said frame intermediate its ends with one end pivotally connected to one of said dogs and its other end in abutting relation to the corresponding end of the other lever, a cam actuated by said driving means and a connection between said cam and one of said levers whereby to oscillate both levers and simultaneously actuate said dogs.

10. A machine as defined in claim 9 wherein there is a mounting member for each dog rotatable in said frame, each dog is eccentrically mounted in its mounting for adjustment of the dogs upon rotation of said mounting members and there is means for holding said mounting members in adjusted positions.

11. A machine for operating upon a workpiece, comprising a frame, a punch mounted on the lower end of said frame, a die, said die and punch having coacting portions to receive between them and operate upon said workpiece, driving means for actuating said punch to cause coaction of said punch and die upon said workpiece, a combined die support and work clamp beneath said punch, mounting means on said frame providing for movement of said die support and work clamp toward and away from said punch so as to move and to release a workpiece and said die into and from work-operating relation to said punch, respectively, a driving shaft and a motor drivingly connected thereto, mechanism to move said die support and work clamp into and out of said work-operating position, and apparatus for connecting said driving means and said mechanism to said driving shaft to move said die support and work clamp toward and away from said punch in timed relation to the starting and stopping of said driving means, said apparatus including a control shaft, a driving connection between said driving shaft and said control shaft including a clutch, and means including manually operable push buttons for initially actuating said clutch to connect said control shaft to said driving shaft to actuate the die holder and work clamp into work-operating position, and automatic means to stop said control shaft after one-half revolution and simultaneously start operation of said drving means to actuate said punch and to stop operation of said driving means and punch after a predetermined period and simultaneously start rotation of said control shaft through the second-half of its revolution to actuate the die holder and work clamp out of work-operation position.

12. A machine as defined in claim 11 wherein said means for initially connecting the driving shaft to the control shaft includes two coactive clutch elements one of which has a continuous driving connection with said driving shaft and the other of which is rotatable with and relatively slidable longitudinally on said control shaft, a yoke having clutch pins and being movable to cause alternate coaction of said pins with the second mentioned clutch element for causing the initial starting of said control shaft, said clutch yoke being actuated by said push buttons to initially start the control shaft, and said automatic means including parts driven by said control shaft and elements actuated by said driving means coactive with said parts.

13. A machine as defined in claim 4 with the addition of a starting lever pivotally mounted intermediate its ends on said frame and connected to said apparatus, a floating link pivotally mounted intermediate its ends on said starting lever, two manually operable push buttons each abuttingly engaging one end of said floating link so that upon simultaneous manual pushing of both said buttons said starting lever will be actuated to initiate operation of said apparatus and spring means normally biasing said lever floating link and push buttons into operative position.

14. A machine for operating upon a workpiece, comprising a frame, a punch mounted on the lower end of said frame, a die, said die and punch having coacting portions to receive between them and operate upon said workpiece, driving means for actuating said punch to cause coaction of said punch and die upon said workpiece, a combined die support and work clamp beneath said punch, mounting means on said frame providing for movement of said die support and work clamp toward and away from said punch so as to move and to release a workpiece and said die into and from work-operating relation to said punch, respectively, a driving shaft, mechanism to move said die support and work clamp into and out of said work-operating position, and apparatus for connecting said driving means and said mechanism to said driving shaft to move said die support and work clamp toward and away from said punch in timed relation to the starting and stopping of said driving means including a control shaft, a driving connection between said driving shaft and said control shaft including a clutch, and means including manually operable push buttons for initially actuating said clutch to connect said control shaft to said driving shaft, and automatic means to start and stop said driving means for actuating the punch in timed relation to the movement of said die support and work clamp toward and away from said punch, respectively, said mounting means and said mechanism including rack bars longitudinally slidably mounted in said frame, a horizontal shaft journaled in said frame, a gear on said shaft meshing with each of said rack bars, an operating means for rotating said gears including a pinion fast connected to said gears, a gear segment rigidly connected to said control shaft and meshing with said pinion with a series of teeth to move said die support and work clamp into work-operating position and then to move out of mesh with said pinion, and a releasable lock for holding the die support and work clamp in work operating position comprising cam surfaces on said gear segment beyond one end of said series of teeth, and a follower for said cam surfaces connected to said horizontal shaft, said lock eliminating any load on said clutch during its engaging and disengaging periods.

References Cited in the file of this patent
UNITED STATES PATENTS 2,529,382     Friden                Nov. 7, 1950
2,759,541     Reid                 Aug. 21, 1956